United States Patent [19]

Kondo et al.

[11] 4,348,077
[45] Sep. 7, 1982

[54] ELECTROCHROMIC DISPLAY DEVICE

[75] Inventors: Shigeo Kondo, Hirakata; Nobuyuki Yoshiike, Ikoma, both of Japan

[73] Assignee: Matsushita Electric Industrial Co., Ltd., Kadoma, Japan

[21] Appl. No.: 95,380

[22] Filed: Nov. 19, 1979

[30] Foreign Application Priority Data

Nov. 20, 1978 [JP] Japan .................................. 53-143649
Jul. 17, 1979 [JP] Japan .................................. 54-90600

[51] Int. Cl.³ .................................................. G02F 1/17
[52] U.S. Cl. ...................................... 350/357; 252/408
[58] Field of Search ........................ 350/357; 252/408

[56] References Cited

U.S. PATENT DOCUMENTS

| 3,451,741 | 6/1969 | Manos | 350/357 |
| 3,712,709 | 1/1973 | Kenworthy | 350/357 |
| 3,806,229 | 4/1974 | Schoot et al. | 350/357 |
| 3,839,857 | 10/1974 | Berets et al. | 350/357 |
| 3,930,717 | 1/1976 | McDermott et al. | 350/357 |
| 3,951,521 | 4/1976 | Findl | 350/357 |
| 4,018,508 | 4/1977 | McDermott et al. | 350/357 |
| 4,073,570 | 2/1978 | Korinek | 350/357 |
| 4,116,535 | 9/1978 | Ponjee et al. | 350/357 |

FOREIGN PATENT DOCUMENTS

| 17977 | 10/1980 | European Pat. Off. | 350/357 |
| 56-4122 | 1/1981 | Japan | 350/357 |

Primary Examiner—Teddy S. Gron
Attorney, Agent, or Firm—Amster, Rothstein & Engelberg

[57] ABSTRACT

The present invention relates to a display device utilizing an electrochemically reversible coloring reaction and, more specifically, to an electrochromic display device (referred to as ECD hereinafter) which makes it possible to carry out a stable display to appearing-disappearing performance using an iron compound insoluble to an electrolyte as an electrochemical reactant to a counter electrode. In order to operate an ECD stably, it is necessary to stabilize the electro-potential applied to the counter electrode. The ECD of the invention is characterized by using iron berlinate or derivatives thereof as a potential stabilizing material of the counter electrode, and the ECD is constructed with a display electrode and a counter electrode provided with the said compound as a reactive component thereon, thereby making it possible to maintain a stably display function. Furthermore the invention relates also to an ECD using a solid thin film of an electrochromic substance as a display electrode, in which lithium fluoborate is used as a supporting substance of the electrolyte and water is added to the electrolyte in a concentration of 0.1 to 2 Mol/l, thereby improving the temperature performance and response speed of the ECD without affecting its working life thereof.

55 Claims, 3 Drawing Figures

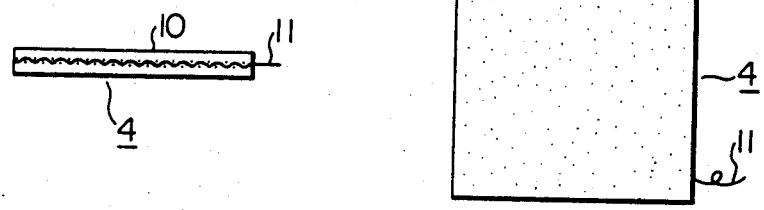
FIG. 2(a)
FIG. 2(b)
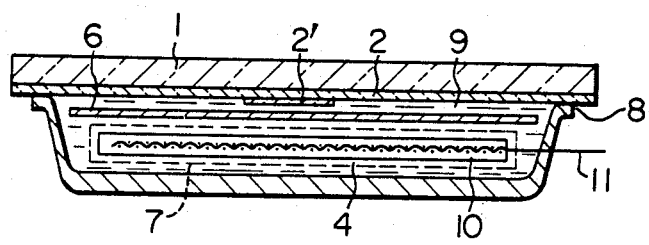
FIG. 3

ELECTROCHROMIC DISPLAY DEVICE

The present invention relates to an electrochromic display device (ECD) utilizing an electrochemical oxidation and reduction reactions.

ECDs are classified into several types. One of them is ECD in which an electrochromic (EC) substance is dissolved in an electrolyte and oxidized and reduced on the surface of a display electrode. The EC substance is reversibly deposited on the surface of the display electrode for display. Another type is one in which a solid thin film of EC substance is provided on the display electrode and display and non-display operations are carried out by electrochemically oxidizing and reducing said EC substance on the electrode.

The former type ECD is disclosed in C. J. Shoot et al., "Appl. Phys. Letter" vol 23, page 64(1973). The ECD uses as an EC substance di-n-heptyl-4,4'-pyridinium bromide which is dissolved in an aqueous solution in which potassium bromide is dissolved as a supporting electrolyte.

The display operation of this type of ECD will be discussed in more detail in the following. The electrochemically reversible reactions of 4,4'-dipyrimidium salt are carried out according to the following formula to maintain stable display and non-display to operations

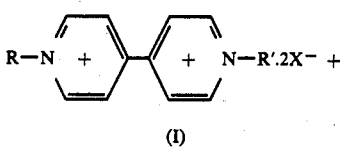

(1)

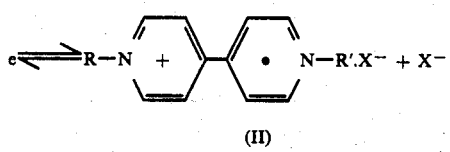

(II)

wherein R and R' stand for respectively an alkyl, phenyl, alkoxycarbonylalkyl or phenylalkyl group and the like, and $X^-$ signifies an electrochemically inert mono-valent anion such as $Br^-$, $BF_4^-$ or $ClO_4^-$ etc.

The 4,4'-dipyridinium compound is dissolved in the electrolyte in a colourless state. If an electric potential to electrochemically reduce the compound is applied to the display electrode to electrochemically reduce the compound, the compound is converted into the monocation radical (II) of the compound according to the formula (1) and is changed into purple-color state. The radical (II) is reduced into the compound (III) by a lower electric potential according to the formula (2).

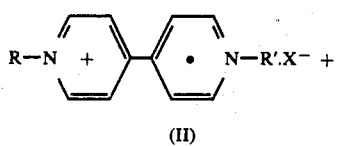

(2)

(III)

The reaction shown in the formula (2) is electrochemically irreversible and the formation of the radical (III) in a display device makes it difficult to carry out reversible display and non-display reactions.

Accordingly, the electric potential applied to the display electrode should be regulated within a range of carrying out the electrochemical reversible reactions for display and non-display. Therefore it is necessary to provide a reference electrode in an actual display device as disclosed in prior art.

In other examples, disclosed in Japanese Patent Laid Open Gazette 30519/1974 and 3070/1975, reduction and oxidation reactions of couple of $Fe^{II}/Fe^{III}$ ion are carried out in an electrolyte and said reversible reactions of the couple of $Fe^{II}/Fe^{III}$ ion was utilized for reactions on a counter electrode. However, to utilize the reversible reactions of the couple of $Fe^{II}/Fe^{III}$, ion pH of the electrolyte must be at 2.5 or lower. In the case of using an electrolyte having pH of 2.5 or lower, the use of 4,4'-dipyridinium display materials other than p-dicyanophenyl, 4,4'-dipyridinium chloride material causes a serious problem in which a decomposition reaction of water is carried out earlier under an electric potential higher than the potential necessary for advancing the reversible coloring reaction to generate hydrogen which would bring about a breakdown of the equipment and the like.

In another example of ECD, the utilization of electrochemical colouring phenomena of a thin film of tungsten oxide which is used as a display material is disclosed in Japanese Patent Laid Open Gazette No. 8983/1972, 13891/1972 and 1392/1972. In this prior art the use of several kinds of materials such as a reduced form of tungsten, platinum, carbon or the like as a counter electrode of ECD is disclosed. However, in the case of using the reduced form of tungsten oxide, the display operation becomes unstable, because of the instability of said reduced form compound. That is to say, the reactions which are carried out on the display electrode and counter electrode of this form of display device are shown in a formula (3) and each electrode utilizes respectively the reversible reaction in the reaction formula (3).

$$WO_3 + zH^+ + ne^- \rightleftharpoons H_zWO_3 \qquad (3)$$

An electric potential for the oxidation and reduction reactions ($_1E_{Red/ox}$) is expressed according to Nernst's equation as follows.

$$_1E_{Red/ox} = {_w}E_o + \frac{RT}{nF} \ln \frac{[H^+]^z}{[H_zWO_3]} \qquad (4)$$

wherein $_wE_o$ signifies the standard electric potential applied to an electrode of $WO_3/HWO_3$, n signifies the number of electrons taking part in the reactions and equals to z, F signifies the Faradey's constant, R signifies the gas constant, T signifies an absolute temperature, $[H^+]$ signifies the amount of proton concentrated in the electrolyte and [H$_z$WO$_3$] signifies the amount of the reduced form compound of WO$_3$. As is apparent from the formula (4), it can be seen that the electric potential for oxidation and reduction reactions on the electrode of WO$_3$/H$_z$WO$_3$ varies according to the amount of concentration proton and, the amount of the reduced form of WO$_3$. In an ECD utilizing the reduced form of WO$_3$, (H$_z$WO$_3$) in a counter electrode, the amount of H$_z$WO$_3$ varies in stationary state or working state. As a result, the potential of the counter electrode varies to make the potential applied to the display electrode unstable, thereby making the display unstable.

The present invention has been accomplished on the basis of the discovery that both the oxidized form and the reduced form of iron berlinate, potassium berlinate and the like, which is insoluble in an electrolyte, carry out their electrochemical reversible reactions reversibly in an aqueous electrolyte and an organic electrolyte, and thus the invention can provide an improved ECD having a long life by the use of the reduced form of said compound as a counter electrode material for of EDC.

The electrochemical reaction of iron berlinate has not been made clear yet, but it is assumed to be as in the following.

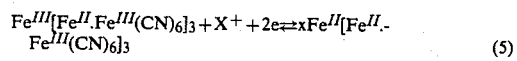
(5)

An electric potential for oxidation and reduction reactions ($_2$E$_{Red/ox}$) of the formula (5) is shown as the following.

$$2E \cdot Red/ox = {_{Fe}}E_o + \frac{RT}{nF} \ln \frac{[Fe^{III}[Fe^{II} \cdot Fe^{III}(CN)_6]_3][X^+]}{[xFe^{II}[Fe^{II} \cdot Fe^{III}(CN)_6]_3]} \quad (6)$$

wherein $_{Fe}E_o$ signifies the standard electric potential of iron berlinate for oxidation and reduction reactions, [X$^+$] signifies the amount of cation concentrated in an electrolyte and

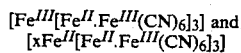

signifies respectively the value of concentration of iron berlinate and the reduced form thereof.

However iron berlinate and the reduced form thereof are solid, and thus both formulas put in perenthesis in the above amount to 1. Therefore $_2$E$_{Red/Ox}$ relates only to the value of [X$^+$], and $_2$E$_{Red/Ox}$ is expected to be hardly changed by keeping the value of [X$^+$] in the electrolyte constant.

Therefore, in the ECD using said material in a counter electrode, a constant voltage can be applied to the display electrode to make the display stable.

FIG. 2 is a sectional view (a) and a plane view (b) showing the counter electrode in the same embodiment shown in FIG. 1.

FIG. 3 is a sectional view of the counter electrode of another embodiment of the invention.

The present invention will be illustrated in the following by way of the examples without any intention of imparing any liminations to the invention, which is construed only on the basis of the appended claims.

EXAMPLE 1

Figure 1A:
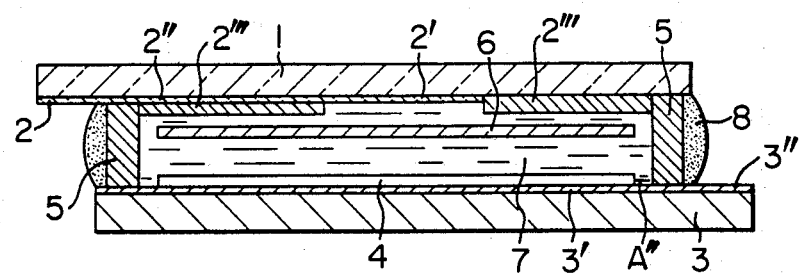
FIG. 1 is a sectional view (a) and a plane view (b) of an embodiment of the ECD unit of the present invention.
Figure 1B:
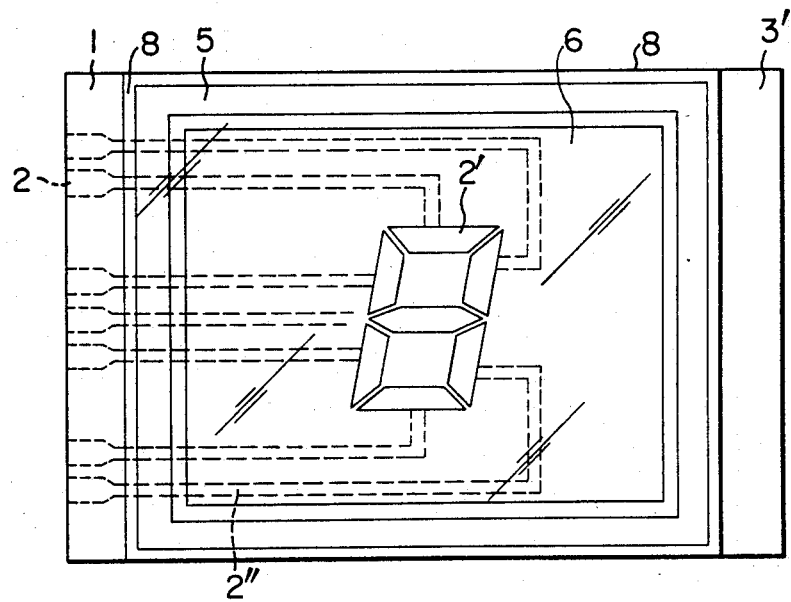

In FIG. 1, 1 shows a clear base plate, and 2 shows a thin film clear electrode which acts also as a terminal for applying a voltage to a display electrode 2'. An electrode 2'' is a lead electrode covered with glass 2''', in order to avoid contact with an electrolyte 7. 3 is a back base plate on the surface of which an inert thin film of metal 3', such as platinum, rhodium or the like is attached and is in contact with a counter electrode (composite electrode) 4. 3'' shows a terminal for applying a voltage to the counter electrode. 5 shows a spacer made of insulating resin such as polyethylene or polypropyrene. 6 shows a light scattering plate made of porous polyethylene, filter paper or glass fibre. 8 shows epoxy resin for sealing. 7 shows an electrolyte which is an aqueous solution containing di-n-octyl-4,4'-dipyridinium chloride which has a concentration value of 0.03 M/l and potasium chloride which has a concentration value of 0.3 M/l.

Hereupon, the counter electrode was formed by hot-pressing a mixture of iron berlinate, graphite and polyethylene powder in a mixing ratio of respectively 10:5:2. The counter electrode 4 was previously electrically reduced in an aqueous solution of potassium chloride having a concentration value of 0.3 M/l. The counter electrode 4 may have a construction shown in FIGS. 2(a) and (b) in which 10 shows a collector electrode which is framed of a wire or mesh made of inert metal such as gold, silver and the like. 11 shows a lead wire which is contacted at A'' point in FIG. 1(a).

The ECD carried out display operation by applying a voltage of −0.67 volts to the counter electrode 4, and carried out non-display operation by short-circuiting the electrode or applying positive voltage to the electrode. A life test by repeating the operations of display and non-display and disappearing was carried out on the obtained ECD. The test was conducted at a room temperature under a condition in which the voltage applied to the electrode 4 for display was −0.67 V, the applying time thereof was 0.5 sec, memory time of display was 58.0 sec., the voltage applied to the electrode 4 for non-display was +0.3 V and the applying time thereof was 1.5 sec. The results of the test showed the fact that no change appeared in the characteristics of display and non-display of the ECD even after the tests over 3×10$^5$ times was repeated.

To be compared with the above-mentioned ECD, a reference ECD was tested, which had a conventional counter electrode made of silver/silver chloride as a reactive material. A life test of the ECD was conducted under a condition in which the display voltage was −0.75 V (applying time: 0.5 sec.), memory time was 58.0 sec. and the non-display voltage was +0.15 V (applying time 1.5 sec.). As a result of the life test, the non-display operation of the ECD could not be carried out the tests of about 180 times was completed. The reason for the occurance of trouble on the non-display step may be due to the fact that the silver in the reactive material on the counter electrode was dissolved into electrolyte as silver ion and the silver was deposited on the display electrode and reacted with 4,4'-dipyridinium monocation radical to convert it into an electrochemically irreversible substance.

EXAMPLE 2

As shown in FIG. 3, thin film of tungsten oxide, which was vapour-evaporated with a pattern on a clear thin film electrode (2) and had a thickness of about 2000 Å to 1μ, was used as a display electrode. An electrolyte 9 was prepared by dissolving lithium perchlorate (LiClO$_4$) in propylene carbonate PC by a concentration value of 1 M/l. A counter electrode 4 was prepared by hot-pressing a mixture of iron berlinate, graphite and polyethylene powder respectively in a mixing ratio of 10:5:2 and was previously reduced in a LiClO$_4$/PC electrolyte having a concentration value of 1 M of LiClO$_4$ per liter of PC.

A life test of the ECD was repeated under a condition having display voltage of −1.1 V (applying time: 1 sec.), memory time of 56 sec. and non-display voltage of +1.1 V (applying time: 3 sec.). As the result of the test no change was observed in its display characteristic even after repeating the test over $3 \times 10^5$ times.

To be compared with the above ECD, a reference ECD was prepared by using gold as the reactive material of the counter electrode. Then the reference ECD was subjected to a life test under a condition having display voltage of −1.5 V (applying time: 1 sec.), memory time of 56 sec. and non-display voltage of 1.5 V (applying time: 3 sec.). As the result of the test, trouble occured on the non-display operation of the reference ECD after about $1 \times 10^4$ tests. The reason for the occurrence of the trouble seems to be due to the fact that gold in the reactive material of the counter electrode was dissolved electrochemically and deposited on the display electrode to cause trouble on the non-display operation.

EXAMPLE 3

Iron berlinate of reactive substance in counter electrode in Example 2 was replaced by potassium berlinate and a similar ECD was prepared. The obtained ECD was tested under the same conditions as in Example 2 and it was verified that the ECD gave the same performance as that of ECD of Example 2.

EXAMPLE 4

The same ECD as in the Example 2 was prepared except for using sodium berlinate instead of iron berlinate in Example 2, and was tested in the same manner as in Example 2. The test results showed the fact that the ECD of this example had the same performance as that of Example 2.

EXAMPLE 5

The same ECD as in Example 2 was prepared except for using a molybdenum oxide thin film instead of a tungsten oxide thin film in Example 2. The obtained ECD was tested in a similar manner as in Example 2 and the test results showed that fact that the ECD had the same performance as that of Example 2.

EXAMPLE 6

The same ECD as in Example 2 was prepared except for using iridium oxide thin film instead of tungsten oxide thin film of Example 2. The obtained ECD was tested in a similar manner as in Example 2, and the test results showed that the ECD had the same performance as that of Example 2.

EXAMPLE 7

The same ECD as in Example 2 was prepared except for using as the electrolyte PC solution of lithium fluoborate having a concentration value of 1 mol of lithium borofluoride per 1 liter of PC instead of lithium perchlorate in Example 2. The obtained ECD was tested in a similar manner to that of Example 2. The test results showed the fact that the ECD had the same performance as that of Example 2 and especially showed a superior performance capability over that of Example 2 in a test at a temperature over 70° C. and in a test after a long term storage at a higher temperature, such as over 70° C.

EXAMPLE 8

The same ECD as in Example 2 was prepared except for using γ-butyrolactone as the electrolyte instead of PC in Example 2, and was tested in a similar manner as in Example 2. The ECD showed the same performance as that of Example 2.

EXAMPLE 9

The same ECD as in Example 2 was prepared except for using as the electrolyte, solutions containing water having a concentration value of 0.1 to 2 mol per liter, and the obtained ECD was tested. The test results showed that the ECD had the same performances as that of Example 2. Furthermore the ECD of this example is superior in its display and response characteristics to that of Example 2.

What we claim is:

1. An electrochromic display device having a display memory function, comprising:
    an electrolyte;
    at least one display electrode disposed in contact with said electrolyte;
    at least one counter electrode spaced from said display electrode and disposed in contact with the electrolyte, said counter electrode containing at least berlinate which is insoluble in the electrolyte; and
    means for applying first and second electric potentials between said display and counter electrodes for causing reversible oxidation and reduction reactions on the electrodes,
    said first electric potential being substantially constant to cause a stable display to appear on the display electrode which display is maintained even after removal of said first electric potential, said second electric potential being applied to cause the display to disappear.

2. The electrochromic display device according to claim 1, wherein said berlinate is selected from the group consisting of iron berlinate, potassium berlinate and sodium berlinate.

3. The electrochromic display device according to claim 1 wherein said display electrode includes a material selected from tungsten oxide, molybdenum oxide and iridium oxide.

4. The electrochromic display device according to claim 1 wherein said electrolyte is a solution containing lithium borofluoride.

5. The electrochromic display device according to claim 1 wherein said electrolyte is made of organic solvent which is mainly composed of propylene carbonate or γ-butyrolactone.

6. The electrochromic display device according to claim 1 wherein water is contained in said electrolyte in a concentration of 0.1 to 2 M/l.

7. The electrochromic display device according to claim 1 wherein said electrolyte is an aqueous solution containing 4,4'-dipyridinium compound.

8. An electrochromic display device having a display memory function, comprising:
an electrolyte;
at least one display electrode disposed in contact with said electrolyte;
at least one counter electrode spaced from said display electrode and disposed in contact with the electrolyte, said counter electrode containing at least iron berlinate which is insoluble in the electrolyte; and
means for applying first and second electric potentials between said display and counter electrodes for causing reversible oxidation and reduction reactions on the electrodes,
said first electric potential being substantially constant to cause a stable display to appear on the display electrode which display is maintained even after removal of said first electric potential, said second electric potential being applied to cause the display to disappear.

9. An electrochromic display device having a display memory function, comprising:
an electrolyte;
at least one display electrode disposed in contact with said electrolyte;
at least one counter electrode spaced from said display electrode and disposed in contact with the electrolyte, said counter electrode containing at least potassium berlinate which is insoluble in the electrolyte; and
means for applying first and second electric potentials between said display and counter electrodes for causing reversible oxidation and reduction reactions on the electrodes,
said first electric potential being substantially constant to cause a stable display to appear on the display electrode which display is maintained even after removal of said first electric potential, said second electric potential being applied to cause the display to disappear.

10. An electrochromic display device having a display memory function, comprising:
an electrolyte;
at least one display electrode disposed in contact with said electrolyte;
at least one counter electrode spaced from said display electrode and disposed in contact with the electrolyte, said counter electrode containing at least sodium berlinate which is insoluble in the electrolyte; and
means for applying first and second electric potentials between said display and counter electrodes for causing reversible oxidation and reduction reactions on the electrodes,
said first electric potential being substantially constant to cause a stable display to appear on the display electrode which display is maintained even after removal of said first electric potential, said second electric potential being applied to cause the display to disappear.

11. An electrochromic display device having a display memory function, comprising:
an electrolyte which is an aqueous solution containing at least 4,4'-dipyridinium chloride and potassium chloride;
at least one display electrode disposed in contact with said electrolyte;
at least one counter electrode spaced from said display electrode and disposed in contact with the electrolyte, said counter electrode containing at least iron berlinate which is insoluble in the electrolyte; and
means for applying first and second electric potentials between said display and counter electrodes for causing reversible oxidation and reduction reactions on the electrodes,
said first electric potential being substantially constant to cause a stable display to appear on the display electrode which display is maintained even after removal of said first electric potential, said second electric potential being applied to cause the display to disappear.

12. The electrochromic display device according to claim 11, wherein said counter electrode is formed by hot-pressing a material containing iron berlinate.

13. The electrochromic display device according to claim 12, wherein said material is a mixture of iron berlinate, graphite and polyethylene powder.

14. The electrochromic display device according to claim 11, wherein said counter electrode is formed by electrically reducing said counter electrode in an aqueous solution of potassium chloride.

15. An electrochromic display device having a display memory function, comprising:
an electrolyte;
at least one display electrode disposed in contact with said electrolyte, said display electrode containing tungsten oxide;
at least one counter electrode spaced from said display electrode and disposed in contact with the electrolyte, said counter electrode containing at least iron berlinate which is insoluble in the electrolyte; and
means for applying first and second electric potentials between said display and counter electrodes for causing reversible oxidation and reduction reactions on the electrodes,
said first electric potential being substantially constant to cause a stable display to appear on the display electrode which display is maintained even after removal of said first electric potential, said second electric potential being applied to cause the display to disappear.

16. The electrochromic display device according to claim 15, wherein said electrolyte is prepared by dissolving lithium perchlorate in propylene carbonate.

17. The electrochromic display device according to claim 15, wherein said counter electrode is formed by hot-pressing a material containing iron berlinate.

18. The electrochromic display device according to claim 17, wherein said material is a mixture of iron berlinate, graphite and polyethylene powder.

19. The electrochromic display device according to claim 16, wherein said counter electrode is formed by electrically reducing the counter electrode in lithium perchlorate/propylene carbonate solution.

20. An electrochromic display device having a display memory function, comprising:
an electrolyte;
at least one display electrode disposed in contact with said electrolyte, said display electrode containing tungsten oxide;
at least one counter electrode spaced from said display electrode and disposed in contact with the electrolyte, said counter electrode containing at least potassium berlinate which is insoluble in the electrolyte; and means for applying first and second electric potentials between said display and counter electrodes for causing reversible oxidation and reduction reactions on the electrodes, said first electric potential being substantially constant to cause a stable display to appear on the display electrode which display is maintained even after removal of said first electric potential, said second electric potential being applied to cause the display to disappear.

21. The electrochromic display device according to claim 20, wherein said electrolyte is prepared by dissolving lithium perchlorate in propylene carbonate.

22. The electrochromic display device according to claim 20, wherein said counter electrode is formed by hot-pressing a material containing potassium berlinate.

23. The electrochromic display device according to claim 22, wherein said material is a mixture of potassium berlinate, graphite and polyethylene powder.

24. The electrochromic display device according to claim 21, wherein said counter electrode is formed by electrically reducing the counter electrode in lithium perchlorate/propylene carbonate solution.

25. An electrochromic display device having a display memory function, comprising:
    an electrolyte;
    at least one display electrode disposed in contact with said electrolyte, said display electrode containing tungsten oxide;
    at least one counter electrode spaced from said display electrode and disposed in contact with the electrolyte, said counter electrode containing at least sodium berlinate which is insoluble in the electrolyte; and
    means for applying first and second electric potentials between said display and counter electrodes for causing reversible oxidation and reduction reactions on the electrodes,
    said first electric potential being substantially constant to cause a stable display to appear on the display electrode which display is maintained even after removal of said first electric potential, said second electric potential being applied to cause the display to disappear.

26. The electrochromic display device according to claim 25, wherein said electrolyte is prepared by dissolving lithium perchlorate in propylene carbonate.

27. The electrochromic display device according to claim 25, wherein said counter electrode is formed by hot-pressing a material containing sodium berlinate.

28. The electrochromic display device according to claim 27, wherein said material is a mixture of sodium berlinate, graphite and polyethylene powder.

29. The electrochromic display device according to claim 26, wherein said counter electrode is formed by electrically reducing the counter electrode in lithium perchlorate/propylene carbonate solution.

30. An electrochromic display device having a display memory function, comprising:
    an electrolyte;
    at least one display electrode disposed in contact with said electrolyte, said display electrode containing molybdenum oxide;
    at least one counter electrode spaced from said display electrode and disposed in contact with the electrolyte, said counter electrode containing at least iron berlinate which is insoluble in the electrolyte; and
    means for applying first and second electric potentials between said display and counter electrodes for causing reversible oxidation and reduction reactions on the electrodes,
    said first electric potential being substantially constant to cause a stable display to appear on the display electrode which display is maintained even after removal of said first electric potential, said second electric potential being applied to cause the display to disappear.

31. The electrochromic display device according to claim 30, wherein said electrolyte is prepared by dissolving lithium perchlorate in propylene carbonate.

32. The electrochromic display device according to claim 30, wherein said counter electrode is formed by hot-pressing a material containing iron berlinate.

33. The electrochromic display device according to claim 32, wherein said material is a mixture of iron berlinate, graphite and polyethylene powder.

34. The electrochromic display device according to claim 31, wherein said counter electrode is formed by electrically reducing the counter electrode in lithium perchlorate/propylene carbonate solution.

35. An electrochromic display device having a display memory function, comprising:
    an electrolyte;
    at least one display electrode disposed in contact with said electrolyte, said display electrode containing iridium oxide;
    at least one counter electrode spaced from said display electrode and disposed in contact with the electrolyte, said counter electrode containing at least iron berlinate which is insoluble in the electrolyte; and
    means for applying first and second electric potentials between said display and counter electrodes for causing reversible oxidation and reduction reactions on the electrodes,
    said first electric potential being substantially constant to cause a stable display to appear on the display electrode which display is maintained even after removal of said first electric potential, said second electric potential being applied to cause the display to disappear.

36. The electrochromic display device according to claim 35, wherein said electrolyte is prepared by dissolving lithium perchlorate in propylene carbonate.

37. The electrochromic display device according to claim 35, wherein said counter electrode is formed by hot-pressing a material containing iron berlinate.

38. The electrochromic display device according to claim 37, wherein said material is a mixture of iron berlinate, graphite and polyethylene powder.

39. The electrochromic display device according to claim 36, wherein said counter electrode is formed by electrically reducing the counter electrode in lithium perchlorate/propylene carbonate solution.

40. An electrochromic display device having a display memory function, comprising:
    an electrolyte being propylene carbonate solution of lithium fluoborate having lithium borofluoride;
    at least one display electrode disposed in contact with said electrolyte, said display electrode containing tungsten oxide;
    at least one counter electrode spaced from said display electrode and disposed in contact with the electrolyte, said counter electrode containing at least iron berlinate which is insoluble in the electrolyte; and means for applying first and second electric potentials between said display and counter electrodes for causing reversible oxidation and reduction reactions on the electrodes, said first electric potential being substantially constant to cause a stable display to appear on the display electrode which display is maintained even after removal of said first electric potential, said second electric potential being applied to cause the display to disappear.

41. The electrochromic display device according to claim 40, wherein said counter electrode is formed by hot-pressing a material containing iron berlinate.

42. The electrochromic display device according to claim 41, wherein said material is a mixture of iron berlinate, graphite and polyethylene powder.

43. The electrochromic display device according to claim 41, wherein said counter electrode is formed by electrically reducing the counter electrode in said electrolyte solution.

44. An electrochromic display device having a display memory function, comprising:
an electrolyte containing at least $\gamma$-butyrolactone;
at least one display electrode disposed in contact with said electrolyte, said display electrode containing tungsten oxide;
at least one counter electrode spaced from said display electrode and disposed in contact with the electrolyte, said counter electrode containing at least iron berlinate which is insoluble in the electrolyte; and
means for applying first and second electric potentials between said display and counter electrodes for causing reversible oxidation and reduction reactions on the electrodes,
said first electric potential being substantially constant to cause a stable display to appear on the display electrode which display is maintained even after removal of said first electric potential, said second electric potential being applied to cause the display to disappear.

45. The electrochromic display device according to claim 44, wherein said electrolyte is prepared by dissolving lithium perchlorate in $\gamma$-butyrolactone.

46. The electrochromic display device according to claim 44, wherein said counter electrode is formed by hot-pressing a material containing iron berlinate.

47. The electrochromic display device according to claim 46, wherein said material is a mixture of iron berlinate, graphite and polyethylene powder.

48. The electrochromic display device according to claim 45, wherein said counter electrode is formed by electrically reducing the counter electrode in $\gamma$-butyrolactone.

49. An electrochromic display device having a display memory function; comprising:
an electrolyte containing water in a concentration of 0.1 to 2 mol per liter;
at least one display electrode disposed in contact with said electrolyte, said display electrode being made of tungsten oxide;
at least one counter electrode spaced from said display electrode and disposed in contact with the electrolyte, said counter electrode containing at least iron berlinate which is insoluble in the electrolyte; and
means for applying first and second electric potentials between said display and counter electrodes for causing reversible oxidation and reduction reactions on the electrodes,
said first electric potential being substantially constant to cause a stable display to appear on the display electrode which display is maintained even after removal of said first electric potential, said second electric potential being applied to cause the display to disappear.

50. The electrochromic display device according to claim 49, wherein said electrolyte is prepared by dissolving lithium perchlorate in propylene carbonate.

51. The electrochromic display device according to claim 49, wherein said counter electrode is formed by hot-pressing a material containing iron berlinate.

52. The electrochromic display device according to claim 51, wherein said material is a mixture of iron berlinate, graphite and polyethylene powder.

53. The electrochromic display device according to claim 50, wherein said counter electrode is formed by electrically reducing the counter electrode in lithium perchlorate/propylene carbonate solution.

54. An electrochromic display device having a display memory function, comprising:
an electrolyte;
at least one display electrode disposed in contact with said electrolyte;
a clear plate supporting said display electrode;
at least one counter electrode spaced from the display electrode and disposed in contact with the electrolyte, said counter electrode containing at least berlinate which is insoluble in the electrolyte;
a back plate supporting said counter electrode;
a light scattering plate disposed between said clear plate and back plate;
means for connecting said clear plate and back plate and for sealing to prevent flow-out of the electrolyte filled between said clear plate and back plate; and
means for applying said first and second electric potentials between the display and counter electrodes for causing reversible oxidation and reduction reactions on the electrodes,
said first electric potential being substantially constant to cause a stable display to appear on the display electrode which display is maintained even after removal of said first electric potential, said second electric potential being applied to cause the display to disappear.

55. The electrochromic display device according to claim 54, wherein said display electrode is seven-segments type display.

* * * * *